(12) United States Patent
Jo et al.

(10) Patent No.: US 12,126,749 B2
(45) Date of Patent: Oct. 22, 2024

(54) ELECTRONIC DEVICE WITH KEYLESS SENSOR

(71) Applicant: SAMSUNG ELECTRONICS CO., LTD., Suwon-si (KR)

(72) Inventors: Jeonggyu Jo, Suwon-si (KR); Yonghwa Kim, Suwon-si (KR); Dongil Son, Suwon-si (KR); Dongyoung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 215 days.

(21) Appl. No.: 17/751,009

(22) Filed: May 23, 2022

(65) Prior Publication Data
US 2022/0327878 A1 Oct. 13, 2022

Related U.S. Application Data

(63) Continuation of application No. PCT/KR2022/003819, filed on Mar. 18, 2022.

(30) Foreign Application Priority Data

Apr. 13, 2021 (KR) .................. 10-2021-0047885

(51) Int. Cl.
H04M 1/23 (2006.01)
G02F 1/1333 (2006.01)

(52) U.S. Cl.
CPC ......... H04M 1/236 (2013.01); G02F 1/13338 (2013.01); H04M 2250/22 (2013.01)

(58) Field of Classification Search
CPC ............ H04M 1/236; H04M 2250/22; G02F 1/13338; H01Q 1/2283; H01Q 1/38
See application file for complete search history.

(56) References Cited

U.S. PATENT DOCUMENTS 11,252,831 B2 * 2/2022 Moon .................. H05K 5/0217
11,463,570 B2 * 10/2022 Yoo ...................... H05K 5/0217
(Continued)

FOREIGN PATENT DOCUMENTS

CN 106462293 2/2017
CN 210867788 6/2020
(Continued)

OTHER PUBLICATIONS

Oxford English Dictionary, s.v. "key (n.1), sense V.20," Dec. 2023, https://doi.org/10.1093/OED/2784482356. (Year: 2023).*
(Continued)

Primary Examiner — Julie Anne Watko
(74) Attorney, Agent, or Firm — NIXON & VANDERHYE P.C.

(57) ABSTRACT

An electronic device including a keyless sensor according to various embodiments includes: a case including an opening; a sensor frame provided inside the case and at least partially exposed to an outside of the case through the opening, the sensor frame including a conductive part and a non-conductive part; and a hybrid sensor provided inside the case and accommodated in the sensor frame, wherein the hybrid sensor includes: a base disposed in the sensor frame; a pressure sensor disposed on the base and in contact with the conductive part; and a touch sensor disposed on the base and in contact with the non-conductive part.

20 Claims, 5 Drawing Sheets

(56) References Cited

U.S. PATENT DOCUMENTS

| | | | |
|---|---|---|---|
| 2010/0140073 A1 | 6/2010 | Lee | |
| 2014/0240254 A1 | 8/2014 | Chen | |
| 2017/0351354 A1 | 12/2017 | Yoon | |
| 2020/0153115 A1* | 5/2020 | Yun | G06F 3/0412 |
| 2020/0186180 A1* | 6/2020 | Park | H04B 1/3833 |
| 2020/0357208 A1 | 11/2020 | Hyun | |
| 2020/0365973 A1* | 11/2020 | Jeon | H01Q 9/0407 |

FOREIGN PATENT DOCUMENTS

| | | | | |
|---|---|---|---|---|
| CN | 112088525 A | * | 12/2020 | ............ H01Q 1/02 |
| CN | 112352414 A | * | 2/2021 | ............ H01Q 1/12 |
| CN | 112673524 A | * | 4/2021 | ............ H01Q 1/243 |
| CN | 112119540 B | * | 11/2023 | ........... H01Q 1/2283 |
| KR | 10-2011-0092669 | | 8/2011 | |
| KR | 10-2012-0000630 | | 1/2012 | |
| KR | 10-1168710 | | 7/2012 | |
| KR | 10-1555511 | | 9/2015 | |
| KR | 10-1659181 | | 9/2016 | |
| KR | 10-2017-0140702 | | 12/2017 | |
| KR | 10-2019-0027553 | | 3/2019 | |
| KR | 10-2019-0084669 | | 7/2019 | |
| KR | 20190084669 A | * | 7/2019 | |
| KR | 10-2020-0130020 | | 11/2020 | |
| WO | WO-2022065856 A1 | * | 3/2022 | ........... G06F 1/1628 |

OTHER PUBLICATIONS

Oxford English Dictionary, s.v. "keyless (adj.)," Dec. 2023, https://doi.org/10.1093/OED/1790705196. (Year: 2023).*

Search Report issued Jun. 21, 2022 in counterpart International Patent Application PCTKR2022003819 and English translation, 5 pages.

* cited by examiner

ELECTRONIC DEVICE WITH KEYLESS SENSOR

CROSS-REFERENCE TO RELATED APPLICATIONS

This application is a continuation of International Application No. PCT/KR2022/003819 designating the United States, filed on Mar. 18, 2022, in the Korean Intellectual Property Receiving Office and claiming priority to Korean Patent Application No. 10-2021-0047885, filed on Apr. 13, 2021, in the Korean Intellectual Property Office, the disclosures of which are incorporated by reference herein in their entireties.

BACKGROUND

1. Field

The disclosure relates to an electronic device, for example, to an electronic device including a keyless sensor.

2. Description of Related Art

A keyless sensor may be substituted for a physical button such as a power button and/or a volume control button located on a side and rear by inserting a sensor into a display or a frame of a smartphone. If a button is removed due to use of the keyless sensor, the smartphone may have a smoother appearance and a sense of unity in terms of a design. Various issues that may occur by employing buttons may be solved.

For example, the keyless sensor may include a pressure sensor inserted into a portion of a side metal. Here, the pressure sensor may be implemented as at least one of a strain gauge, a force sensing resistor (FSR) sensor, an inductive sensor, and/or a capacitance. When the side metal is pressed, the pressure may be sensed. For example, the pressure sensor may sense inductive pressure.

If the keyless sensor includes a single pressure sensor, the pressure sensor may malfunction due to distortion and/or deformation of an electronic device. To address such an issue, a method of adding an algorithm may be taken into consideration. If the algorithm is added, a threshold for operating the keyless sensor may increase, which may result in a decrease in usability.

SUMMARY

Embodiments of the disclosure provide an electronic device including a keyless sensor that may increase convenience of use through a hybrid sensor including a pressure sensor and a touch sensor.

According to various example embodiments, an electronic device including a keyless sensor may include: a case including an opening; a sensor frame including a conductive part and a non-conductive part, provided inside the case, and at least partially exposed to the outside of the case through the opening; and a hybrid sensor provided inside the case and accommodated in the sensor frame. The hybrid sensor may include: a base disposed in the sensor frame; a pressure sensor disposed on the base and in contact with the conductive part; and a touch sensor disposed on the base and in contact with the non-conductive part.

According to various example embodiments, an electronic device including a keyless sensor may include: a case including an opening; a sensor frame including a frame body provided inside the case and a frame head including a conductive part and a non-conductive part and connected to the frame body; and a hybrid sensor provided inside the case and accommodated in the sensor frame. The hybrid sensor may include: a base disposed in the sensor frame and including a main surface facing the frame head, a top surface facing an inner wall of the case, and a bottom surface disposed on the frame body; a pressure sensor disposed on the main surface of the base and in contact with the conductive part; and a touch sensor disposed on the main surface of the base and in contact with the non-conductive part.

According to various example embodiments, an electronic device including a keyless sensor may include: a sensor frame including a frame body, a frame head including a conductive part and a non-conductive part and connected to the frame body, and a frame cover protruding from the frame body and facing the frame head; and a hybrid sensor accommodated in the sensor frame between the frame head and the frame cover. The hybrid sensor may include: a base disposed in the sensor frame; a pressure sensor disposed on the base and in contact with the conductive part; and a touch sensor disposed on the base and in contact with the non-conductive part.

According to various example embodiments, it is possible to increase convenience of use through a hybrid sensor including a pressure sensor and a touch sensor.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
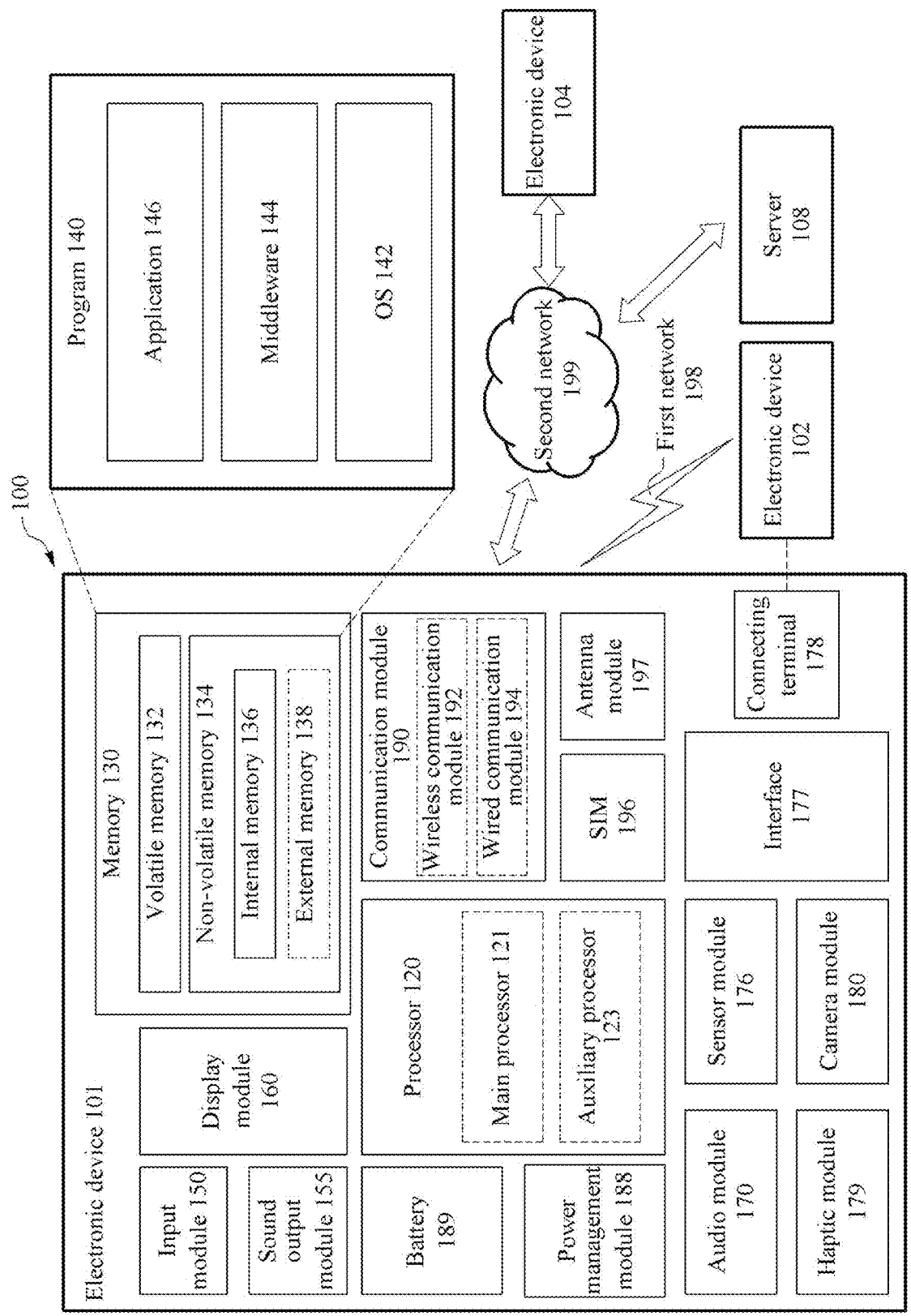
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may be omitted.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the above components may be omitted from the electronic device 101, or one or more other components may be added in the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
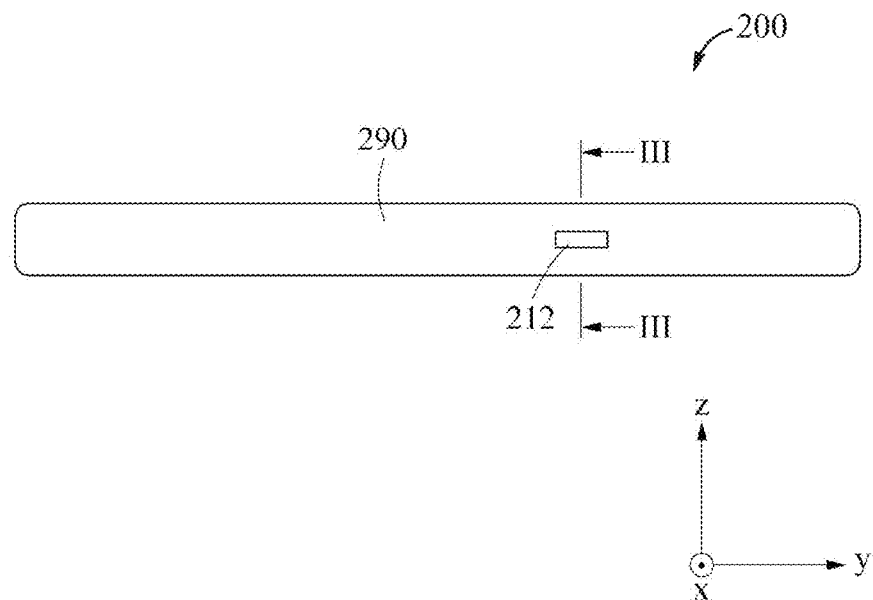
FIG. 2 is a diagram illustrating a side of an electronic device according to various embodiments.

FIG. 2 is a diagram illustrating a side of an electronic device according to various embodiments.

Referring to FIG. 2, an electronic device 200 (e.g., the electronic device 101 of FIG. 1) may include a case 290 and a frame head 212 exposed to one surface of the case 290.

The case 290 may form an external appearance of the electronic device 200 (e.g., the electronic device 101 of FIG. 1). The case 290 may accommodate components of the electronic device 200 (e.g., the electronic device 101 of FIG. 1). For example, the case 290 may accommodate at least one of the processor 120, the memory 130, the input module 150, the sound output module 155, the display module 160, the audio module 170, the haptic module 179, the camera module 180, the power management module 188, the battery 189, the communication module 190, the SIM 196, the antenna module 197 and/or the connecting terminal 178.

In an example, the frame head 212 may be exposed to the outside of the case 290. In another example, the frame head 212 may be configured integrally with neighboring structures instead of being separately exposed to the outside. In an example, a region in which the frame head 212 is located may be separately engraved and/or marked with a different color, so that users may easily recognize a position of a keyless sensor. In another example, a method of displaying a figure for indicating a position of the frame head 212 on a display may be used. A user may transmit a signal to the keyless sensor by contacting the frame head 212 or applying pressure to the frame head 212. The keyless sensor may sense a signal received from the user, for example, a touch signal or a pressure signal. For example, the frame head 212 may be a configuration of at least one of the sensor module 176 and/or the interface 177 of FIG. 1. For example, the frame head 212 may include a conductor. For example, the frame head 212 may include at least one of silver, gold, copper, aluminum, steel, and/or mercury.

For example, the frame head 212 may be provided on a side of the case 290, for example, on a portion facing an x-axis direction in an outer surface of the case 290, but the position of the frame head 212 is not limited thereto. For example, the frame head 212 may be provided on a top surface and/or a bottom surface of the case 290, for example, on a portion facing a y-axis direction in the outer surfaces of the case 290, or provided on a front surface and/or a rear surface of the case 290, for example, a portion facing a z-axis direction in the outer surface of the case 290.

Figure 3A:
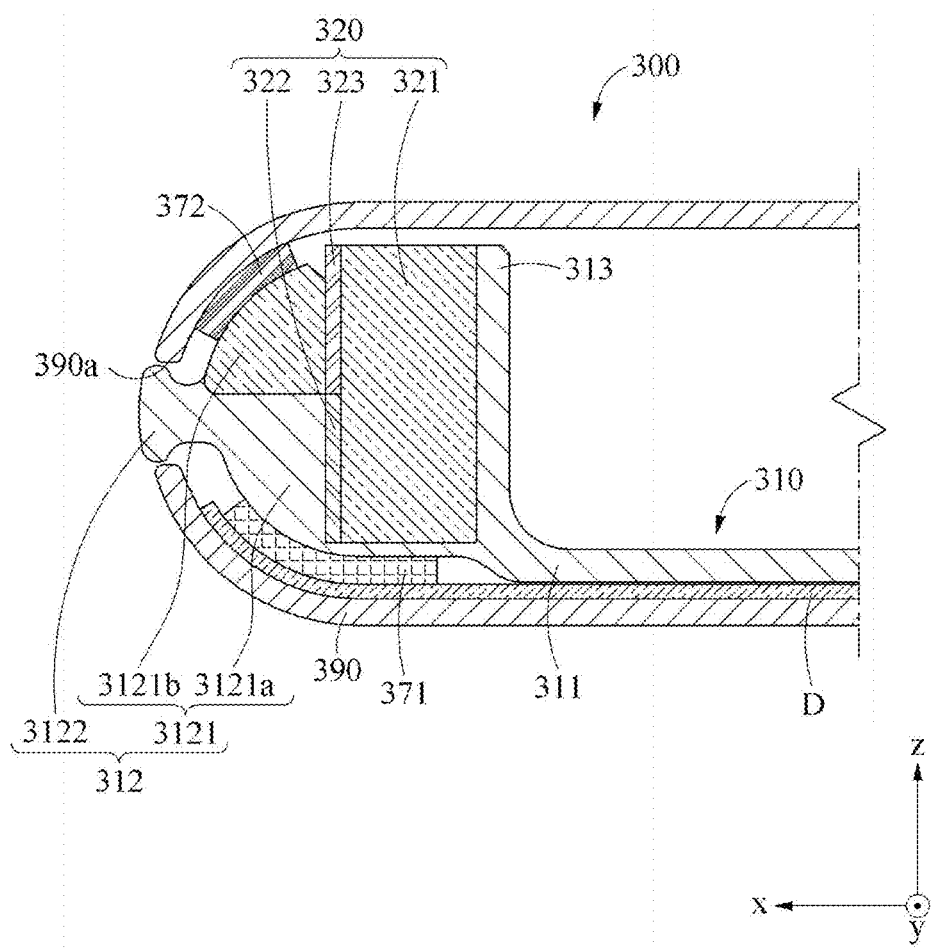
FIG. 3A is a cross-sectional view taken along a line of FIG. 2 according to various embodiments.
Figure 3B:
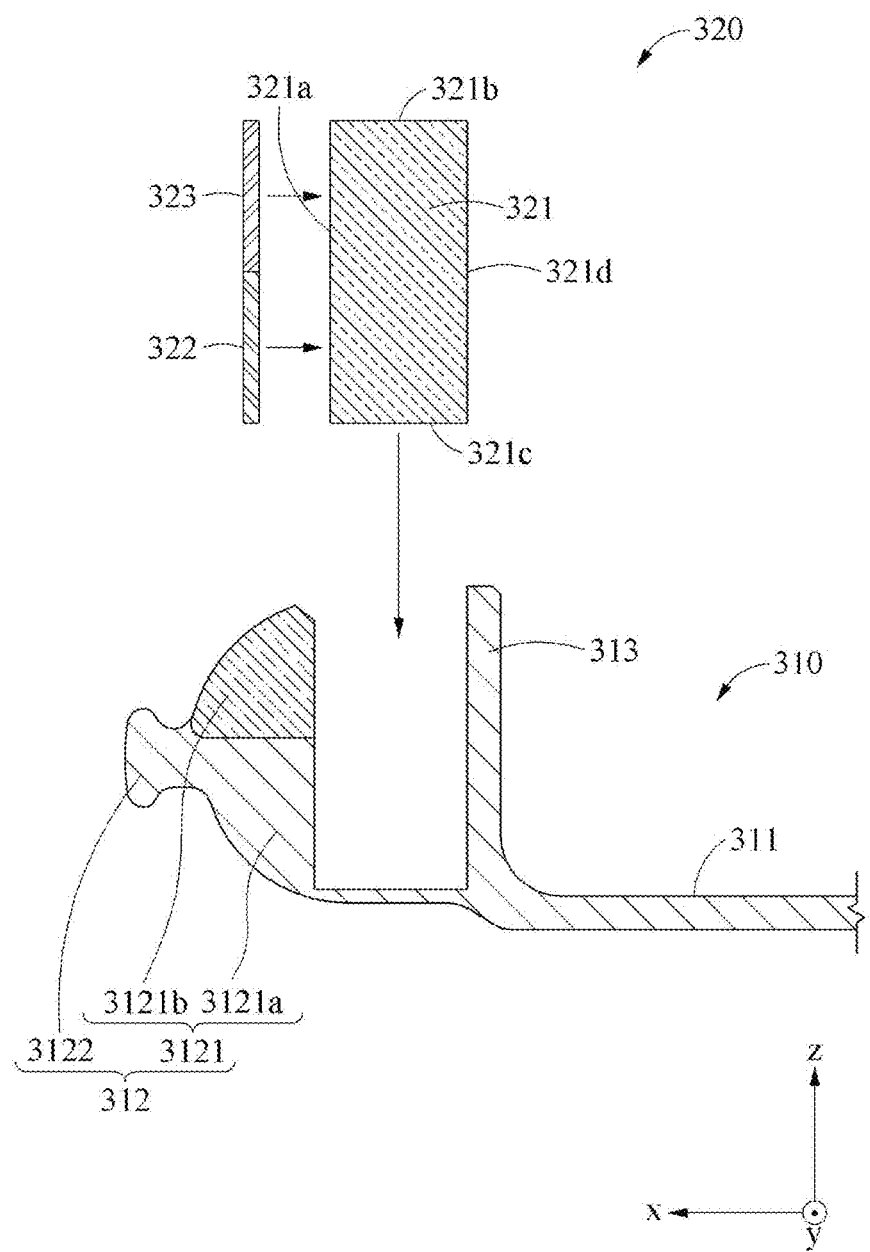
FIG. 3B is an exploded cross-sectional view of an electronic device according to various embodiments.

FIG. 3A is a cross-sectional view taken along a line of FIG. 2 according to various embodiments, and FIG. 3B is an exploded cross-sectional view of an electronic device according to various embodiments.

Referring to FIGS. 3A and 3B, an electronic device 300 (e.g., the electronic device 101 of FIG. 1) may include a case 390 having an opening 390a, a sensor frame 310 accommodated in the case 390, a hybrid sensor 320, waterproof tapes 371 and 372, and a display D. In this disclosure, a "keyless sensor" may be a term collectively referring to a sensor frame and a hybrid sensor. In other words, the keyless sensor may include a sensor frame and a hybrid sensor.

The sensor frame 310 may include a conductive part and a non-conductive part, and may be provided inside the case 390. At least a portion of the sensor frame 310 may be exposed to the outside of the case 390 through the opening 390a. A user may transmit a signal by touching the sensor frame 310, and the keyless sensor may sense a corresponding signal.

The sensor frame 310 may include a frame body 311 provided inside the case 390, a frame head 312 connected to one end of the frame body 311, and a frame cover 313 protruding from the frame body 311. For example, the sensor frame 310 may include an accommodation space having approximately a shape of "C" based on a cross section. The hybrid sensor 320 may be accommodated in the accommodation space.

At least a portion of the sensor frame 310 may protrude outward from an outer surface of the case 390. Due to such a structure, a user may easily touch the sensor frame 310. For example, the frame head 312 may partially protrude outward from the case 390 through the opening 390a.

The frame body 311 may be formed to be wide in a width direction of the case 390. The frame body 311 may be attached to, for example, the display D connected to an inner wall of the case 390. For example, an adhesive layer for bonding the frame body 311 and the display D may be provided on the frame body 311 and/or the display D. The frame body 311 may comprise a conductor.

The frame head 312 may include a head body 3121 that includes a conductive part 3121a and a non-conductive part 3121b and connected to one end of the frame body 311, and a head protrusion 3122 that protrudes from the head body 3121 and is exposed to the outside of the case 390 through the opening 390a.

The conductive part 3121a may be connected to the frame body 311 and the head protrusion 3122. Through the conductive part 3121a, the head protrusion 3122 and the frame body 311 may be electrically connected to each other. The conductive part 3121a may be provided between the frame body 311 and the non-conductive part 3121b. In other words, the non-conductive part 3121b may be provided at an opposite side of the frame body 311 with respect to the conductive part 3121a. The non-conductive part 3121b may not contact the frame body 311. The conductive part 3121a may include, for example, and without limitation, at least one of silver, gold, copper, aluminum, steel, and/or mercury.

The non-conductive part 3121b may be connected to the conductive part 3121a. The non-conductive part 3121b may be spaced apart from the head protrusion 3122 and may not be directly connected to the head protrusion 3122. In other words, the non-conductive part 3121b may be connected to the head protrusion 3122 indirectly through the conductive part 3121a. The non-conductive part 3121b may be formed integrally with the conductive part 3121a or separately from the conductive part 3121a. When the non-conductive part 3121b is formed separately from the conductive part 3121a, the non-conductive part 3121b may be detachable from the conductive part 3121a. The non-conductive part 3121b may include, for example, and without limitation, at least one of plastic, rubber, glass, and/or wood.

The frame cover 313 may protrude from the frame body 311 and face the frame head 312 at a position spaced apart from the frame head 312. The frame cover 313 may comprise a conductor. For example, the frame cover 313 may include, for example, and without limitation, at least one of gold, copper, aluminum, steel, and/or mercury.

The frame body 311, the frame head 312, and the frame cover 313 may form an accommodation space opened toward one side, for example, a +z direction. In a corresponding accommodation space, the hybrid sensor 320 may be seated. The hybrid sensor 320 may be inserted between the frame head 312 and the frame cover 313.

The hybrid sensor 320 may include a base 321 disposed in the sensor frame 310, a pressure sensor 322 that is disposed on the base 321 and that is in contact with the conductive part 3121a, and a touch sensor 323 that is disposed on the base 321 and that is in contact with the non-conductive part 3121b. The hybrid sensor 320 may sense whether a touch is made through the touch sensor 323 and sense an intensity of pressure through the pressure sensor 322.

For example, the hybrid sensor 320 may primarily recognize a capacitance touch in the non-conductive part 3121b, may secondly recognize an inductive pressure in the conductive part 3121a, and may determine a final input value by comparing the capacitance touch and the inductive pressure.

The base 321 may include a main surface 321a facing the frame head 312, a top surface 321b facing the inner wall of the case 390, a bottom surface 321c disposed on the frame body 311, and a support surface 321d facing the frame cover 313. At least three surfaces of the hybrid sensor 320 may be covered by the sensor frame 310. The frame cover 313 of the sensor frame 310 may support the support surface 321d of the base 321 to prevent and/or inhibit the base 321 from moving in a −x direction. The frame body 311 of the sensor frame 310 may support the bottom surface 321c of the base 321 to prevent and/or inhibit the base 321 from moving in a −z direction. The frame head 312 of the sensor frame 310 may support the main surface 321a of the base 321, the pressure sensor 322 and/or the touch sensor 323 to prevent and/or inhibit the base 321 from moving in a +x direction. The case 390 may support the base 321 to prevent and/or inhibit the base 321 from deviating from the sensor frame 310 in the +z direction. The pressure sensor 322 and the touch sensor 323 may be disposed on the main surface 321a, however, the example embodiments are not limited thereto.

The pressure sensor 322 may sense an intensity of pressure transmitted to the sensor frame 310. For example, the pressure sensor 322 may sense an intensity of pressure applied by a user to the sensor frame 310 with his or her finger. The pressure sensor 322 may have an area corresponding to the conductive part 3121a. For example, the area of the pressure sensor 322 and an area of the conductive part 3121a may be approximately the same, and the pressure sensor 322 and the conductive part 3121a may face each other. In other words, a size of the area of the pressure sensor 322 facing the conductive part 3121a may be approximately the same as a size of the area of the conductive part 3121a facing the pressure sensor 322.

The touch sensor 323 may sense whether the sensor frame 310 is in contact. For example, the touch sensor 323 may sense whether a user is in contact with the sensor frame 310 with his or her finger. The touch sensor 323 may have an area corresponding to the non-conductive part 3121b. For example, the area of the touch sensor 323 and an area of the non-conductive part 3121b may be approximately the same, and the touch sensor 323 and the non-conductive part 3121b may face each other. In other words, a size of the area of the touch sensor 323 facing the non-conductive part 3121b may be approximately the same as a size of the area of the non-conductive part 3121b facing the touch sensor 323.

The area of the pressure sensor 322 and the area of the touch sensor 323 may be the same. Based on such a structure, sensing performance may be optimized.

The waterproof tapes 371 and 372 may connect the sensor frame 310 and the case 390. The waterproof tapes 371 and 372 may connect the sensor frame 310 and the case 390 in a manner of directly connecting the sensor frame 310 and the case 390 and/or in a manner of connecting the sensor frame 310 and the display D. The waterproof tapes 371 and 372 may reduce or block a flow of moisture into the case 390 from the outside. The waterproof tapes 371 and 372 may include a first waterproof tape 371 that connects the conductive part 3121a and the display D, and a second waterproof tape 372 that connects the non-conductive part 3121b and the case 390. For example, the first waterproof tape 371 and the second waterproof tape 372 may be integrally formed to form a ring shape.

The display D (e.g., the display module 160 of FIG. 1) may be attached to the inner wall of the case 390. The display D may include a plurality of layers (not shown). The display D may be connected to the sensor frame 310. The case 390 may include a glass for transmitting an image displayed on the display D to the outside.

Figure 4:
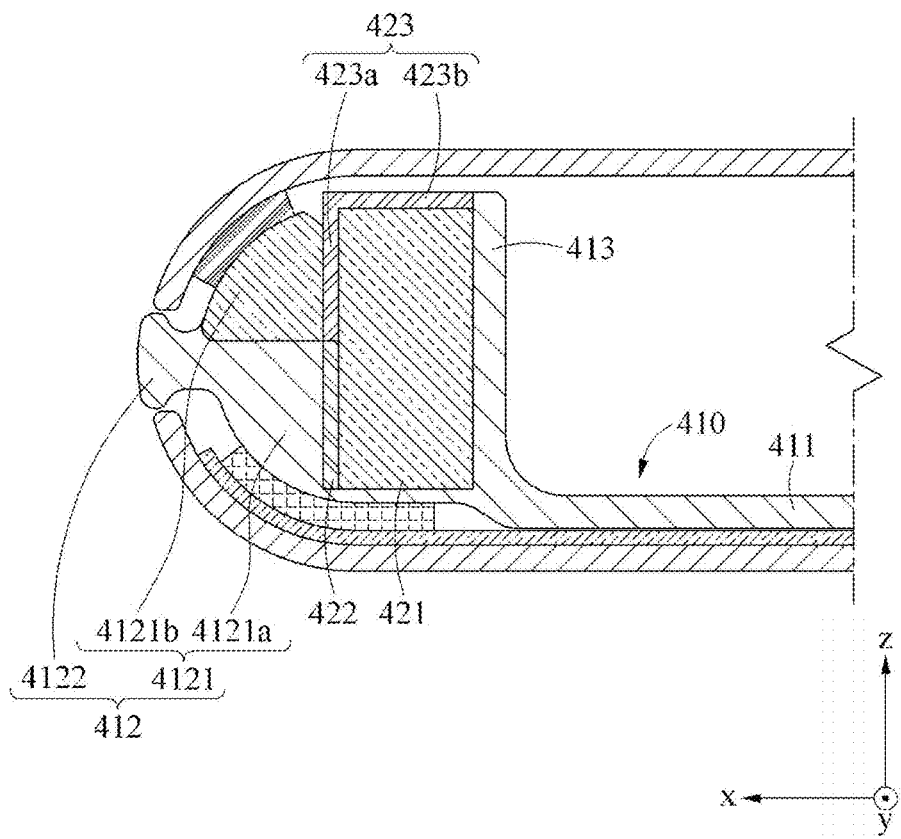
FIG. 4 is a cross-sectional view of an electronic device according to various embodiments.

FIG. 4 is a cross-sectional view of an electronic device according to various embodiments.

Referring to FIG. 4, a base 421 may be mounted in an accommodation space of a sensor frame 410. For example, at least three surfaces of the base 421 may be covered by a frame body 411, a frame head 412, and a frame cover 413.

The frame head 412 may include a head body 4121 and a head protrusion 4122. The head body 4121 may include a conductive part 4121a and a non-conductive part 4121b.

A pressure sensor 422 may be disposed on the base 421 and may be in contact with the conductive part 4121a. An area of the pressure sensor 422 and an area of the conductive part 4121a may be approximately the same, and the pressure sensor 422 and the conductive part 4121a may face each other.

The touch sensor 423 may be bent and may be disposed on a main surface (e.g., the main surface 321a of FIG. 3B) and a top surface (e.g., the top surface 321b of FIG. 3B) of the base 421. In other words, the touch sensor 423 may cover a surface of the base 421 facing a +x direction and a +z direction. For example, the touch sensor 423 may include a first touch sensor part 423a disposed on the main surface, and a second touch sensor part 423b disposed on the top surface. The touch sensor 423 may have a relatively large area in comparison to a state in which the touch sensor 423 is disposed on the main surface only. Based on such a structure, a capacitance area of the touch sensor 423 may be increased, and sensitivity of the touch sensor 423 may be enhanced.

Figure 5:
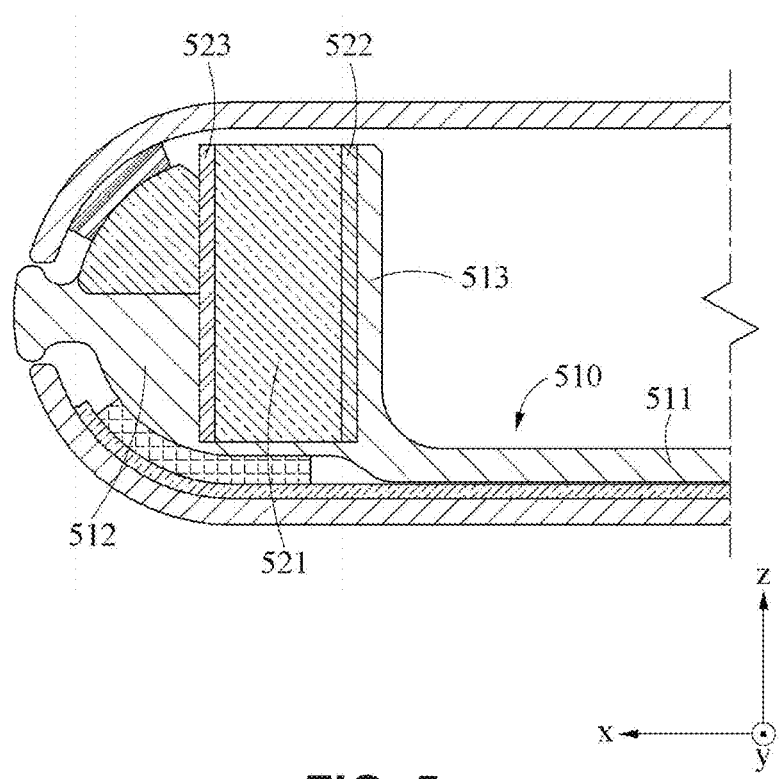
FIG. 5 is a cross-sectional view of an electronic device according to various embodiments.

FIG. 5 is a cross-sectional view of an electronic device according to various embodiments.

Referring to FIG. 5, a base 521 may be mounted in an accommodation space of a sensor frame 510. For example, at least three surfaces of the base 521 may be covered by a frame body 511, a frame head 512, and a frame cover 513.

A pressure sensor 522 may be disposed on a surface of the base 521 facing the frame cover 513. For example, the pressure sensor 522 may cover a surface of the base 521 facing a +x direction.

A touch sensor 523 may be disposed on a surface of the base 521 facing the frame head 512. For example, the touch sensor 523 may face both a conductive part and a non-conductive part of the frame head 512. For example, the touch sensor 523 may cover a surface of the base 521 facing a −x direction.

Figure 6:
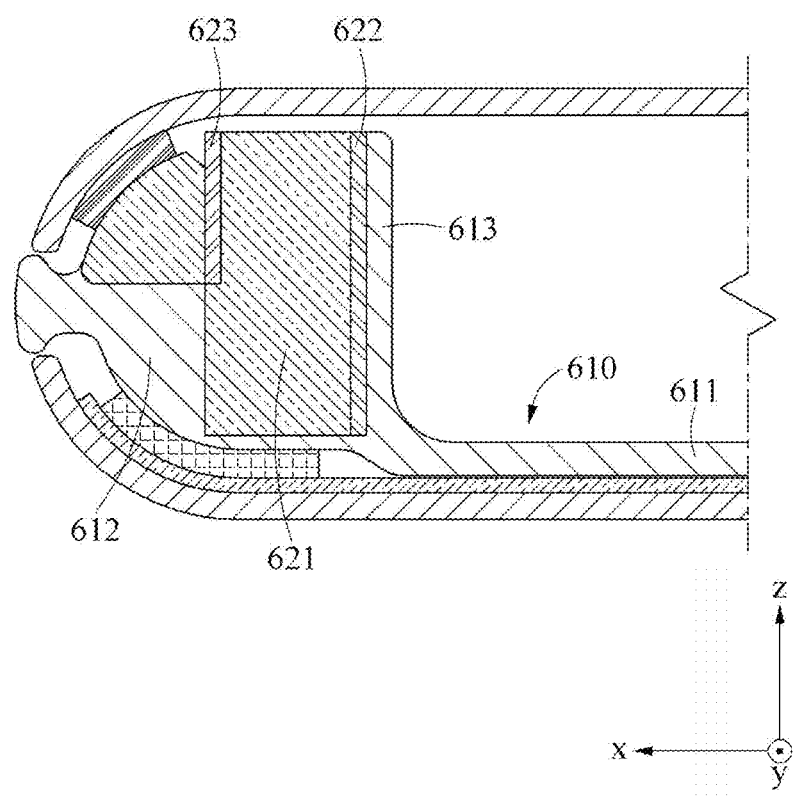
FIG. 6 is a cross-sectional view of an electronic device according to various embodiments.

FIG. 6 is a cross-sectional view of an electronic device according to various embodiments.

Referring to FIG. 6, a base 621 may be mounted in an accommodation space of a sensor frame 610. For example, at least three surfaces of the base 621 may be covered by a frame body 611, a frame head 612, and a frame cover 613.

A pressure sensor 622 may be disposed on a surface of the base 621 facing the frame cover 613. For example, the pressure sensor 622 may cover a surface of the base 621 facing a +x direction.

A touch sensor 623 may be disposed on a surface of the base 621 facing the frame head 612. For example, the touch sensor 623 may face a non-conductive part of the frame head 612. For example, the touch sensor 623 may cover a surface of the base 621 facing a −x direction.

According to various example embodiments, the electronic device including a keyless sensor may include: a case including an opening; a sensor frame including a conductive part and a non-conductive part, provided inside the case, and at least partially exposed to the outside of the case through the opening; and a hybrid sensor provided inside the case and accommodated in the sensor frame. The hybrid sensor may include: the base disposed in the sensor frame; the pressure sensor disposed on the base and in contact with the conductive part of the sensor frame; and a touch sensor disposed on the base and in contact with the non-conductive part of the sensor frame.

According to an example embodiment, the sensor frame may include: a frame body; and frame head including a head body that includes the conductive part and the non-conductive part and connected to one end of the frame body, and a head protrusion part that protrudes from the head body and is exposed to the outside of the case through the opening.

According to an example embodiment, the frame body may comprise a conductor.

According to an example embodiment, conductive part may be provided between the frame body and the non-conductive part.

According to an example embodiment, the head protrusion may protrude from the conductive part.

According to an example embodiment, the sensor frame may further include the frame cover that protrudes from the frame body and provided at an opposite side of the frame head with respect to the hybrid sensor.

According to an example embodiment, the hybrid sensor may be provided in the state of being inserted between the frame head and the frame cover.

According to an example embodiment, the base may include a main surface facing the frame head, a top surface facing the inner wall of the case, a bottom surface disposed on the frame body, and a support surface facing the frame cover.

According to an example embodiment, the touch sensor may be bent and may be disposed on the main surface and the top surface of the base.

According to an example embodiment, the pressure sensor may be disposed on the main surface of the base.

According to an example embodiment, the pressure sensor and the touch sensor may be located on opposite sides of the base.

According to an example embodiment, the pressure sensor may be disposed on the support surface and may be in contact with the frame cover.

According to an example embodiment, the electronic device may further include at least one waterproof tape connecting the sensor frame and the case.

According to an example embodiment, an area of the pressure sensor and an area of the touch sensor may be the same.

According to an example embodiment, at least a portion of the sensor frame may protrude outward from the outer surface of the case.

According to various example embodiments, the electronic device including a keyless sensor may include: the case including an opening; a sensor frame including a frame body provided inside the case and a frame head including a conductive part and a non-conductive part connected to the frame body; and the hybrid sensor provided inside the case and accommodated in the sensor frame. The hybrid sensor may include: a base disposed in the sensor frame and including a main surface facing the frame head, a top surface facing an inner wall of the case, and a bottom surface disposed on the frame body; a pressure sensor disposed on the main surface of the base and in contact with the conductive part; and a touch sensor disposed on the main surface of the base and in contact with the non-conductive part.

According to an example embodiment, the touch sensor may be bent and may be disposed on the main surface and the top surface of the base.

According to an example embodiment, the sensor frame may further include the frame cover protruding from the frame body and facing the frame head at a position spaced apart from the frame head. The base may further include a support surface facing the frame cover.

According to various example embodiments, the electronic device including a keyless sensor may include: the sensor frame including a frame body, a frame head including a conductive part and a non-conductive part and connected to the frame body, and a frame cover protruding from the frame body and facing the frame head; and a hybrid sensor accommodated in the sensor frame in a state of being inserted between the frame head and the frame cover. The hybrid sensor may include: a base disposed in the sensor frame; a pressure sensor disposed on the base and in contact with the conductive part; and the touch sensor disposed on the base and in contact with the non-conductive part.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device including a keyless sensor, the electronic device comprising:
   a case including an opening,
   a sensor frame provided inside the case and at least partially exposed to an outside of the case through the opening, the sensor frame comprising a conductive part and a non-conductive part; and
   a hybrid sensor provided inside the case and accommodated in the sensor frame,
   wherein the hybrid sensor comprises:
      a base disposed in the sensor frame;
      a pressure sensor disposed on the base and in contact with the conductive part; and
      a touch sensor disposed on the base and in contact with the non-conductive part.

2. The electronic device of claim 1, wherein the sensor frame comprises:
   a frame body; and
   a frame head comprising a head body and a head protrusion, the head body comprising the conductive part and the non-conductive part and being connected to one end of the frame body, and the head protrusion protruding from the head body and being exposed to the outside of the case through the opening.

3. The electronic device of claim 2, wherein the frame body comprises a conductor.

4. The electronic device of claim 3, wherein the conductive part is provided between the frame body and the non-conductive part.

5. The electronic device of claim 2, wherein the head protrusion protrudes from the conductive part.

6. The electronic device of claim 2, wherein the sensor frame further comprises a frame cover protruding from the frame body and provided at an opposite side of the frame head with respect to the hybrid sensor.

7. The electronic device of claim 6, wherein the hybrid sensor is provided in a state of being inserted between the frame head and the frame cover.

8. The electronic device of claim 6, wherein the base comprises a main surface facing the frame head, a top surface facing an inner wall of the case, a bottom surface disposed on the frame body, and a support surface facing the frame cover.

9. The electronic device of claim 8, wherein the touch sensor is bent and is disposed on the main surface and the top surface of the base.

10. The electronic device of claim 8, wherein the pressure sensor is disposed on the main surface of the base.

11. The electronic device of claim 8, wherein the pressure sensor and the touch sensor are located on opposite sides of the base.

12. The electronic device of claim 8, wherein the pressure sensor is disposed on the support surface of the base and is in contact with the frame cover.

13. The electronic device of claim 1, further comprising:
at least one waterproof tape connecting the sensor frame and the case.

14. The electronic device of claim 1, wherein an area of the pressure sensor and an area of the touch sensor are equal.

15. The electronic device of claim 1, wherein at least a portion of the sensor frame protrudes outward from an outer surface of the case.

16. An electronic device including a keyless sensor, the electronic device comprising:
a case including an opening,
a sensor frame comprising a frame body provided inside the case, and a frame head comprising a conductive part and a non-conductive part and connected to the frame body; and
a hybrid sensor provided inside the case and accommodated in the sensor frame,
wherein the hybrid sensor comprises:
a base disposed in the sensor frame, the base comprising a main surface facing the frame head, a top surface facing an inner wall of the case, and a bottom surface disposed in the frame body;
a pressure sensor disposed on the main surface of the base and in contact with the conductive part; and
a touch sensor disposed on the main surface of the base and in contact with the non-conductive part.

17. The electronic device of claim 16, wherein the touch sensor is bent and is disposed on the main surface of the base and the top surface of the base.

18. The electronic device of claim 16, wherein
the sensor frame further comprises a frame cover protruding from the frame body and facing the frame head at a position spaced apart from the frame head, and
the base further comprises a support surface facing the frame cover.

19. The electronic device of claim 18, wherein the pressure sensor and the touch sensor are located on opposite sides of the base.

20. An electronic device including a keyless sensor, the electronic device comprising:
a sensor frame comprising a frame body, a frame head comprising a conductive part and a non-conductive part and connected to the frame body, and a frame cover protruding from the frame body and facing the frame head; and
a hybrid sensor accommodated in the sensor frame in a state of being inserted between the frame head and the frame cover;
wherein the hybrid sensor comprises:
a base disposed in the sensor frame;
a pressure sensor disposed on the base and in contact with the conductive part; and
a touch sensor disposed on the base and in contact with the non-conductive part.

* * * * *